United States Patent
Kuehner et al.

(10) Patent No.: US 12,263,867 B2
(45) Date of Patent: Apr. 1, 2025

(54) HUMAN-MACHINE INTERFACE CONTROL SYSTEM

(71) Applicant: Toyota Research Institute, Inc., Los Altos, CA (US)

(72) Inventors: Manuel Ludwig Kuehner, Mountain View, CA (US); Jaime S. Camhi, Los Gatos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 327 days.

(21) Appl. No.: 17/679,334

(22) Filed: Feb. 24, 2022

(65) Prior Publication Data

US 2023/0264712 A1 Aug. 24, 2023

(51) Int. Cl.
*B60W 60/00* (2020.01)
*B60W 10/20* (2006.01)
*B60W 30/09* (2012.01)
*B60W 30/095* (2012.01)
*B60W 50/12* (2012.01)
(Continued)

(52) U.S. Cl.
CPC ........ *B60W 60/0011* (2020.02); *B60W 10/20* (2013.01); *B60W 30/09* (2013.01); *B60W 30/0956* (2013.01); *B60W 50/12* (2013.01); *B62D 6/08* (2013.01); *B62D 15/0265* (2013.01); *B60W 2510/202* (2013.01)

(58) Field of Classification Search
CPC .............. B62D 15/0265; B62D 15/025; B62D 15/0285; B62D 6/08; B60W 10/20; B60W 30/09; B60W 30/095; B60W 30/0956; B60W 50/12; B60W 60/0011; B60W 2510/202

USPC ......................................................... 701/301
See application file for complete search history.

(56) References Cited

U.S. PATENT DOCUMENTS 6,393,362 B1 5/2002 Burns
2012/0303217 A1* 11/2012 Reichel .............. B62D 15/0265
701/41

(Continued)

FOREIGN PATENT DOCUMENTS

CN 112660118 A 4/2021
JP 2021062804 A 4/2021

*Primary Examiner* — Scott A Reinbold
(74) *Attorney, Agent, or Firm* — Christopher G. Darrow; Darrow Mustafa PC (57) ABSTRACT

A system includes a processor and a memory in communication with the processor. The memory has a human-machine interface module having instructions that, when executed by the processor, cause the processor to identify, influenced by sensor data regarding a vehicle and an environment in which the vehicle operates, an event in which the vehicle should perform an autonomous steering maneuver determined by an autonomous driving system. The instructions further cause the processor to, in response to identifying the event, decouple control of a steering rack of the vehicle by a handwheel of the vehicle and lock the handwheel to prevent the handwheel from substantially moving. The instructions further cause the processor to determine, by the autonomous driving system, the autonomous steering maneuver to be performed by the vehicle influenced by an isometric torque input applied to the handwheel and detected by the processor when the handwheel is locked.

14 Claims, 6 Drawing Sheets

(51) Int. Cl.
*B62D 6/08* (2006.01)
*B62D 15/02* (2006.01)

(56) References Cited

U.S. PATENT DOCUMENTS

2020/0290646 A1* 9/2020 Safour ................. B60W 50/14
2021/0114660 A1* 4/2021 Yamashita ............ G08G 1/166

* cited by examiner

HUMAN-MACHINE INTERFACE CONTROL SYSTEM

TECHNICAL FIELD

The subject matter described herein relates, in general, to human-machine interface (HMI) control systems and related methods and, more specifically, to HMI control systems and related methods for a vehicle.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Vehicles include human-machine interface (HMI) systems. HMI systems enable users or drivers of vehicles to engage and interact with the vehicle. HMI systems for vehicles can be numerous and can include heads-up displays (HUDs), touch screens and infotainment systems, voice recognition and voice guidance systems, as well as more traditional HMI systems, such as handwheels, pedals, and the like.

Additionally, some vehicles are also equipped with full or partial autonomous capability and include various sensors that gather a significant amount of information about the vehicle and the environment surrounding the vehicle. The information gathered by the sensors can be used to optimize operation of the vehicle in different circumstances that the vehicle may encounter, thereby improving operation and safety. In some cases, the full or partial autonomous capabilities of the vehicle can override a command provided by the driver via an HMI system.

SUMMARY

This section generally summarizes the disclosure and is not a comprehensive explanation of its full scope or all its features.

In one embodiment, a system includes a processor and a memory in communication with the processor. The memory has a human-machine interface module having instructions that, when executed by the processor, cause the processor to identify, based on sensor data regarding a vehicle and an environment in which the vehicle operates, an event in which the vehicle should perform an autonomous steering maneuver determined by an autonomous driving system. The instructions further cause the processor to, in response to identifying the event, decouple control of a steering rack of the vehicle by a handwheel of the vehicle and lock the handwheel to prevent the handwheel from substantially moving. The instructions further cause the processor to determine, by the autonomous driving system, the autonomous steering maneuver to be performed by the vehicle influenced by an isometric torque input applied to the handwheel and detected by the processor when the handwheel is locked.

In another embodiment, a method includes identifying, by a processor based on sensor data regarding a vehicle and an environment in which the vehicle operates, an event in which the vehicle should perform an autonomous steering maneuver determined by an autonomous driving system. The method further includes, in response to identifying the event, decoupling control of a steering rack of the vehicle by a handwheel of the vehicle and locking the handwheel to prevent the handwheel from substantially moving. The method further includes determining, by the autonomous driving system, the autonomous steering maneuver to be performed by the vehicle influenced by an isometric input torque applied to the handwheel and detected by the processor when the handwheel is locked.

In yet another embodiment, a non-transitory computer-readable medium includes instructions that, when executed by a processor, cause the processor to identify, based on sensor data regarding a vehicle and an environment in which the vehicle operates, an event in which the vehicle should perform an autonomous steering maneuver determined by an autonomous driving system. The instructions further cause the processor to, in response to identifying the event, decouple control of a steering rack of the vehicle by a handwheel of the vehicle and lock the handwheel to prevent the handwheel from substantially moving. The instructions further cause the processor to determine, by the autonomous driving system, the autonomous steering maneuver to be performed by the vehicle influenced by an isometric torque input applied to the handwheel and detected by the processor when the handwheel is locked.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is an HMI control system for a vehicle that may be used in relation to an autonomous driving system of the vehicle. In some cases, the autonomous driving system may temporarily take over control of the steering of the vehicle. This may be possible by having the autonomous driving system actuate a steer-by-wire system implemented in the vehicle. In these cases, a user (e.g., a driver or operator) of the vehicle may be confused and/or distressed when the autonomous driving system takes over, as the user's inputs to a handwheel of the steer-by-wire system might not affect the steering. Therefore, the HMI control system may be used to provide an interface between the autonomous driving system and the user. The HMI control system can be configured to determine an input by the user to the handwheel and use this input to determine an autonomous driving maneuver (e.g., a lateral control maneuver) to be made by the autonomous driving system.

Figure 1:
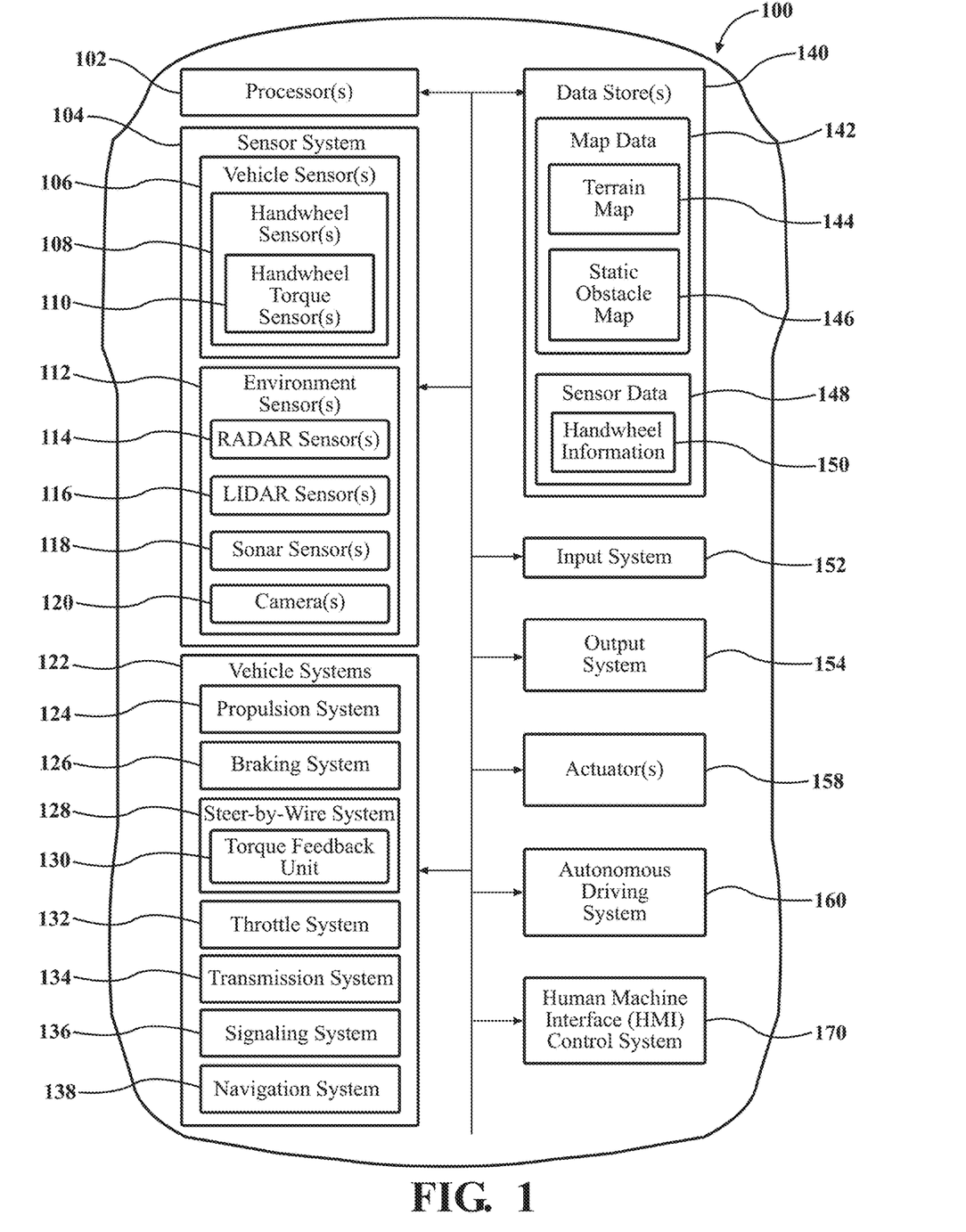
FIG. 1 illustrates one embodiment of a vehicle having an HMI control system.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle 100 according to one or more levels of automation, such as the levels defined by the Society of Automotive Engineers (SAE) (e.g., levels 0-5). As such, the autonomous system may provide semi-autonomous control or fully autonomous control, as discussed in relation to an autonomous driving system 160.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

Figure 2:
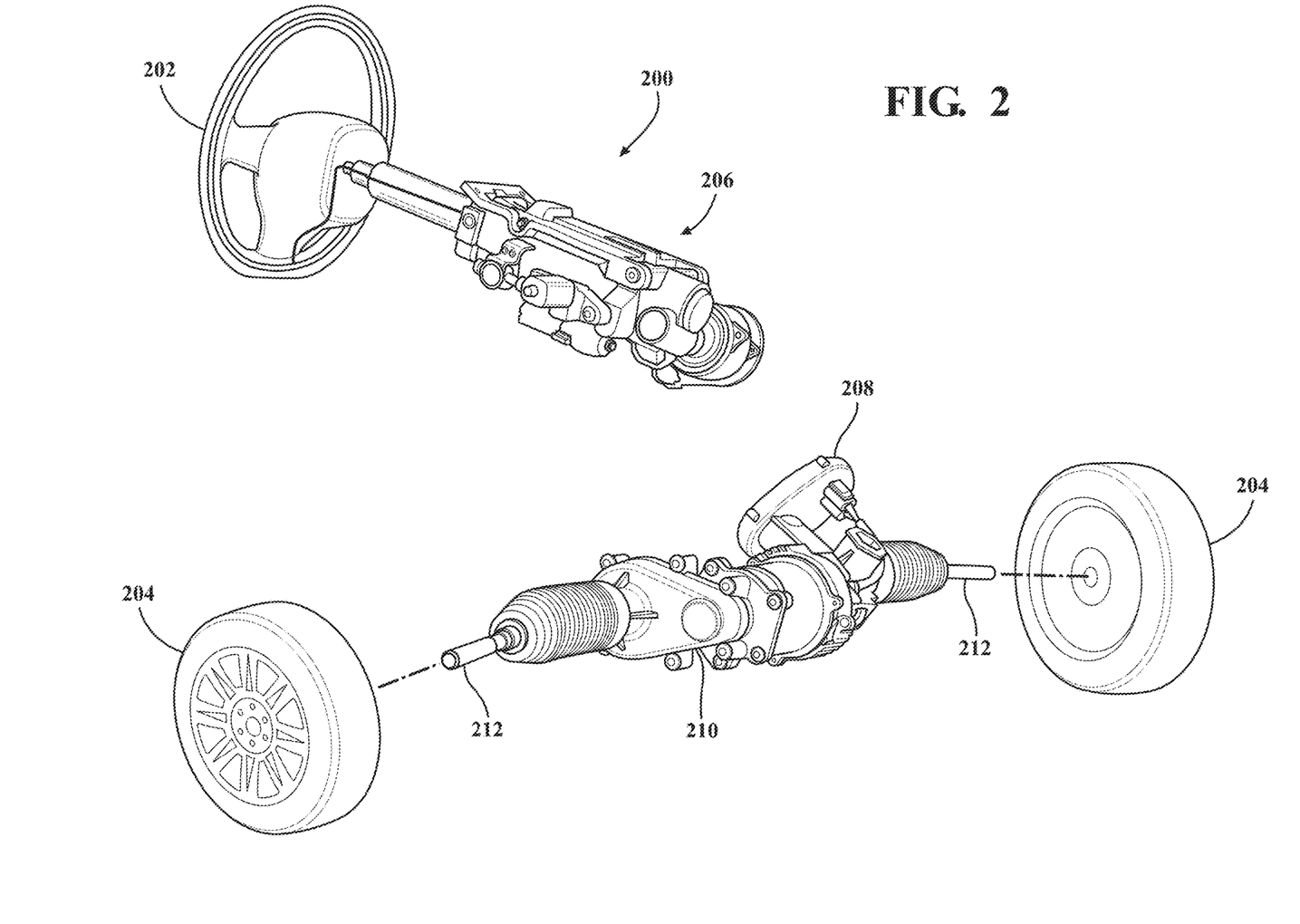
FIG. 2 illustrates an example of a steer-by-wire system that is associated with the vehicle of FIG. 1.

In either case, referring now to FIG. 2, the vehicle 100 includes a steer-by-wire system 200 (e.g., a mechanically uncoupled steering system). The steer-by-wire system 200 is operable to perform one or more steering functions, including but not limited to steering the vehicle 100. Among the steering elements of the steer-by-wire system 200, the vehicle 100 includes a user-operated handwheel 202 (e.g., a steering wheel) on the dash assembly or otherwise housed in the passenger compartment, a steering mechanism at one, some, or all of the wheels 204, and a torque feedback unit 130 (FIG. 1) at the handwheel 202. The steering mechanism is mechanically connected to the wheels 204. The wheels 204 have an adjustable steering angle, and the steering mechanism is operable to adjust the steering angle. As a product of adjusting the steering angle, the steering mechanism is operable to steer the vehicle 100 as it drives along the ground. The torque feedback unit 130 is mechanically connected to the handwheel 202. The torque feedback unit 130 is operable to apply torque to the handwheel 202 as well as measure a torque input applied by a user to the handwheel 202.

The handwheel 202 can be a conventional handwheel 202 typical of a traditional mechanically coupled steering system. The steer-by-wire system 200 can use electrical or electromechanical steering elements for performing steering functions that are traditionally achieved in a mechanically coupled steering system by mechanical linkages, including but not limited to, by the operation of the steering mechanism, adjusting the steering angle in response to user operation of the handwheel 202.

As part of the steering mechanism, the steer-by-wire system 200 includes a steering actuator 206, a pinion 208, a steering rack 210, and tie-rods 212. The pinion 208, the steering rack 210, and the tie-rods 212 are mechanically connected to the wheels 204. The pinion 208, the steering rack 210, and the tie-rods 212 can be conventional steering elements configured to adjust the steering angle by rotating the pinion 208. The handwheel 202 can be electrically connected to the steering rack 210. For example, the handwheel 202 can include a handwheel electronic control unit (ECU) and the steering rack 210 can include a steering rack ECU. The handwheel ECU and the steering rack ECU can be in electronic communication that can be coupled or decoupled. The steering actuator 206 is mechanically connected to the pinion 208. The steering actuator 206 includes an electric motor operable to rotate the pinion 208. By the operation of the electric motor, as a product of rotating the pinion 208, the steering actuator 206 is operable to change the steering angle mechanically independently of user operation of the handwheel 202. By operation of the electric motor, the torque feedback unit 130 is operable to apply a feedback torque to the handwheel 202 for haptically simulating steering feel through the handwheel 202. Without the application of the feedback torque, the handwheel 202 would freely turn, and the user would not experience haptic resistance and/or haptic feedback through the handwheel 202 typical of mechanically coupled steering systems. The feedback torque can be applied to the handwheel 202 substantially at all times while the vehicle 100 is in operation unless there is no need for the feedback torque (e.g., when the vehicle 100 is driving straight, when the vehicle 100 is parked, or when the vehicle 100 is not in operation).

Figure 3:
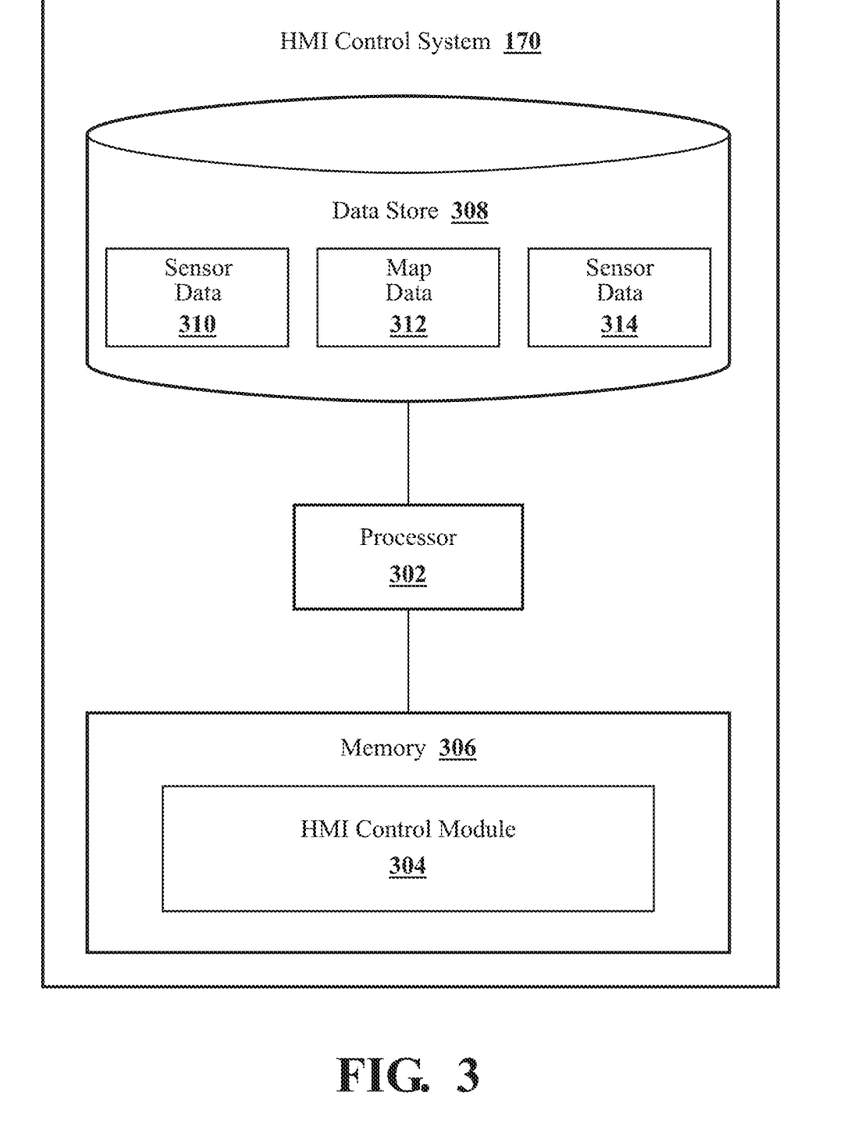
FIG. 3 illustrates an example of an HMI control system that is associated with the vehicle of FIG. 1.

Referring now to FIGS. 2 and 3, the vehicle 100 also includes an HMI control system 170. The HMI control system 170 may be incorporated within the autonomous driving system 160 or may be separate as shown. The HMI control system 170 can include the input system 152 and/or the output system 154 (FIG. 1), heads-up displays (HUDs), touch screens, infotainment systems, voice recognition, and/or voice guidance systems. As described herein, the HMI control system 170 can be used in connection with the steer-by-wire system 200 and the autonomous driving system 160. As will be explained in further detail later, in some cases, the autonomous driving system 160 may identify an event, such as an emergency event, in which the vehicle 100 should take temporary control of the steering of the vehicle 100. For example, the autonomous driving system 160 may take temporary control of the steering of the vehicle 100 to avoid an imminent collision with another vehicle, an object, and/or a person. In these cases, it may be beneficial to allow the user to retain some control over the steering of the vehicle 100 when possible. Therefore, the HMI control system 170 can determine an input of the user to a handwheel 202 of the vehicle 100 and use this information to determine an autonomous steering maneuver to be taken by the autonomous driving system 160.

As shown, the HMI control system 170 includes a processor 302. The processor 302 may be a part of the HMI control system 170 or the HMI control system 170 may access the processor 302 through a data bus or another communication path. The processor 302 can include an application-specific integrated circuit that is configured to implement functions associated with an HMI control module 304. The processor 302 can also be one of the processor(s) 102 of the vehicle 100 shown in FIG. 1. In general, the processor 302 can be an electronic processor such as a microprocessor that is capable of performing various functions as described herein. The processor 302 may be a single processor or may be multiple processors working in concert. Furthermore, the processor 302 may be physically located within the HMI control system 170 or accessed remotely. In one embodiment, the HMI control system 170 includes a memory 306 that stores the HMI control module 304. The memory 306 is a random-access memory (RAM), read-only memory (ROM), a hard disk drive, a flash memory, or other suitable memory for storing the HMI control module 304. The HMI control module 304 includes, for example, computer-readable instructions that, when executed by the processor 302, cause the processor 302 to perform the various functions disclosed herein.

Furthermore, in one embodiment, the HMI control system 170 includes a data store 308. The data store 308 can be one of the data store(s) 140 of the vehicle shown in FIG. 1 or a separate data store. The data store 308 can include an electronic data structure such as a database that is stored in the memory 306 or another memory and that is configured with routines that can be executed by the processor 302 for analyzing stored data, providing stored data, organizing stored data, generating stored data, and so on. Thus, in one embodiment, the data store 308 stores data used by the HMI control module 304 in executing various functions. In one embodiment, the data store 308 includes sensor data 310, map data 312, and handwheel information 314, along with, for example, other information that is used by the HMI control module 304. The sensor data 310 may include some or all of the sensor data 148 shown in FIG. 1 and described later in this disclosure. The map data 312 may include some or all of the map data 142 shown in FIG. 1 and described later in this disclosure. Similarly, the handwheel information 314 may include some or all of the handwheel information 150 shown in FIG. 1 and described later in this disclosure.

Accordingly, the HMI control module 304 generally includes instructions that function to control the processor 302 to collect and/or receive sensor data 310 from a sensor system 104 (FIG. 1) of the vehicle 100. The sensor data 310 can include information about the vehicle 100, such as the speed and/or the acceleration of the vehicle 100, the GPS location of the vehicle 100, and/or information about the dimensions of the vehicle 100. The sensor data 310 can also include information about the external environment of the vehicle 100, for example, information about lane markers, information about nearby vehicles, objects, and/or people, including pedestrians and/or bicyclists, and/or information about weather conditions. The sensor data 310 can also include information about the handwheel 202 of the vehicle 100, for example, a torque input applied to the handwheel 202 by the user of the vehicle 100. More specifically, the handwheel 202 information can include information about an isometric torque input applied by the user to the handwheel 202. As used herein, the term "isometric" can mean static and/or stationary. The HMI control module 304 can also include instructions that function to control the processor 302 to collect and/or receive map data 312.

The HMI control module 304 can also include instructions that function to control the processor 302 to identify an event in which the vehicle 100 should perform an autonomous steering maneuver determined by the autonomous driving system 160. The event can be identified when the vehicle 100 is being operated in a user input mode (e.g., a driver input mode) and/or an autonomous mode, wherein the vehicle 100 operates with little to no user input. The user input mode is an operational mode of the vehicle 100 in which the user controls the lateral movement of the vehicle 100 using the handwheel 202. In other words, the user input mode is an operational mode of the vehicle 100 in which control of the steering rack 210 is coupled to the handwheel 202 (e.g., control of the steering rack 210 by the handwheel 202 has not been decoupled).

The processor 302 can identify the event based on the sensor data 310 about the vehicle 100 and/or the external environment of the vehicle 100 and/or the map data 312. In some examples, the event can be a predicted collision by the vehicle 100 with another object. The processor 302 may be configured to identify a predicted collision by the vehicle 100 with another object using the sensor data 310 and/or the map data 312. For example, the processor 302 can identify a predicted collision by the vehicle 100 with another nearby vehicle, an object in the road, and/or a person such as a pedestrian or a bicyclist.

In other examples, the event can be a predicted or actual operation of the vehicle 100 outside a safety envelope. A safety envelope may be defined as a zone within which the vehicle 100 may travel safely as the vehicle 100 travels along its trajectory. The safety envelope may have a left boundary that is distanced from and on the left side of the vehicle 100 and a right boundary that is distanced from and on the right side of the vehicle 100. However, the safety envelope may also be forward and rearward of the vehicle 100. In one example, the safety envelope may be dynamic and may change in shape based on the curvature of the path that the vehicle 100 is traveling on, an obstacle along or proximate to the path, the speed of the vehicle 100, the type of object located near the vehicle 100, and so on. The safety envelope is a geometrical envelope based on geometrical boundaries of the movement trajectory of the vehicle 100.

The processor 302 may be configured to determine the safety envelope based on the sensor data 310, including the information about the vehicle 100 and/or the information about the external environment. For example, processor 302 may determine the boundaries of the safety envelope based on a predetermined distance from the vehicle 100 and/or the characteristics of the environment. In this example, the processor 302 may determine that the right boundary is three meters from the right side of the vehicle 100 and the left boundary is two meters from the left side of the vehicle 100. In another example, the processor 302 may determine the boundaries of the safety envelope based on road markings, sidewalks, and/or other visible road edges such as a fence, grass, or trees. The processor 302 may receive information about an obstacle on the road within the determined boundary of the safety envelope from the sensor data 310 and may adjust the boundary towards the vehicle 100 to exclude the obstacle from the safety envelope.

The processor 302 may periodically update the safety envelope as the processor 302 receives more information about the external environment and obstacles in the external environment. The processor 302 may use any suitable algorithm, such as a machine learning algorithm or an artificial intelligence process to determine a safety envelope and its boundaries.

The HMI control module 304 further includes instructions that function to control the processor 302 to, in response to identifying an event in which the vehicle 100 should perform an autonomous steering maneuver, decouple control of the steering rack 210 by the handwheel 202. More specifically, decoupling control of the steering rack 210 can include decoupling the electric communication between the electronic control unit of the handwheel 202 and the electronic control unit of the steering rack 210. This can be done so that the user does not substantially influence the steering of the vehicle 100 during the autonomous steering maneuver. The HMI control module 304 further includes instructions that function to control the processor 302 to lock the handwheel 202 after decoupling control of the steering rack 210 by the handwheel 202. This may be done to prevent the handwheel 202 from substantially moving and so that the handwheel 202 does not freely turn during the autonomous steering maneuver. Moreover, the handwheel 202, when locked, is fixed in place and cannot rotate or rotates very little (5° or less) when a torque is applied to it by the driver. In some examples, the handwheel 202 can be locked by using the torque feedback unit 130 to apply a torque to the handwheel 202 so that it does not substantially move. However, other systems and methodologies may also be utilized to lock the handwheel 202 in place.

In some instances, when the handwheel 202 is locked, the user may still have his or her hands on the handwheel 202 and may be attempting to move the handwheel 202. Accordingly, the HMI control module 304 further includes instructions that function to control the processor 302 to detect an isometric torque input applied by the user to the handwheel 202. The isometric torque input is the static or stationary torque applied by the user when the handwheel 202 is locked. For example, the user can apply a clockwise isometric torque or a counterclockwise isometric torque to the handwheel 202. The isometric torque input may be detected through the use of one or more handwheel sensor(s) 108 (FIG. 1), one or more handwheel torque sensor(s) 110 (FIG. 1), and/or the torque feedback unit 130. In some instances, the processor 302 may be configured to use this isometric torque input in determining the autonomous steering maneuver, and can be configured to execute, by the vehicle 100, the autonomous steering maneuver.

For example, if the processor 302 and/or the autonomous driving system 160 identifies a predicted collision by the vehicle 100 with another object and/or a predicted or actual operation of the vehicle 100 outside the safety envelope, and the processor 302 and/or the autonomous driving system 160 determines that the vehicle 100 could safely travel to the right or to the left, the autonomous steering maneuver may be executed by the autonomous driving system 160 in the direction of the isometric torque input. More specifically, if the user applies a clockwise torque, the autonomous steering maneuver can be a rightward maneuver that causes the autonomous driving system 160 to steer the vehicle 100 to the right. If the user applies a counterclockwise torque, the autonomous steering maneuver can be a leftward maneuver that steers the vehicle 100 to the right.

In some cases, though, the processor 302 may determine that the vehicle 100 can only travel safely in one direction upon the identification of a predicted collision by the vehicle 100 with another object and/or a predicted or actual operation of the vehicle 100 outside the safety envelope. In these cases, the processor 302 can ignore the isometric torque input applied by the user to the handwheel 202 and determine the autonomous steering maneuver solely based on the direction in which the vehicle 100 can travel safely. Moreover, if the user applies a clockwise torque to the handwheel 202 indicating a rightward movement, but any maneuver to the right would result in a collision while a maneuver to the left would result in collision avoidance, the processor 302 will ignore the isometric torque input applied to the handwheel 202 and have the autonomous driving system 160 steer the vehicle 100 to the left.

Figure 4:
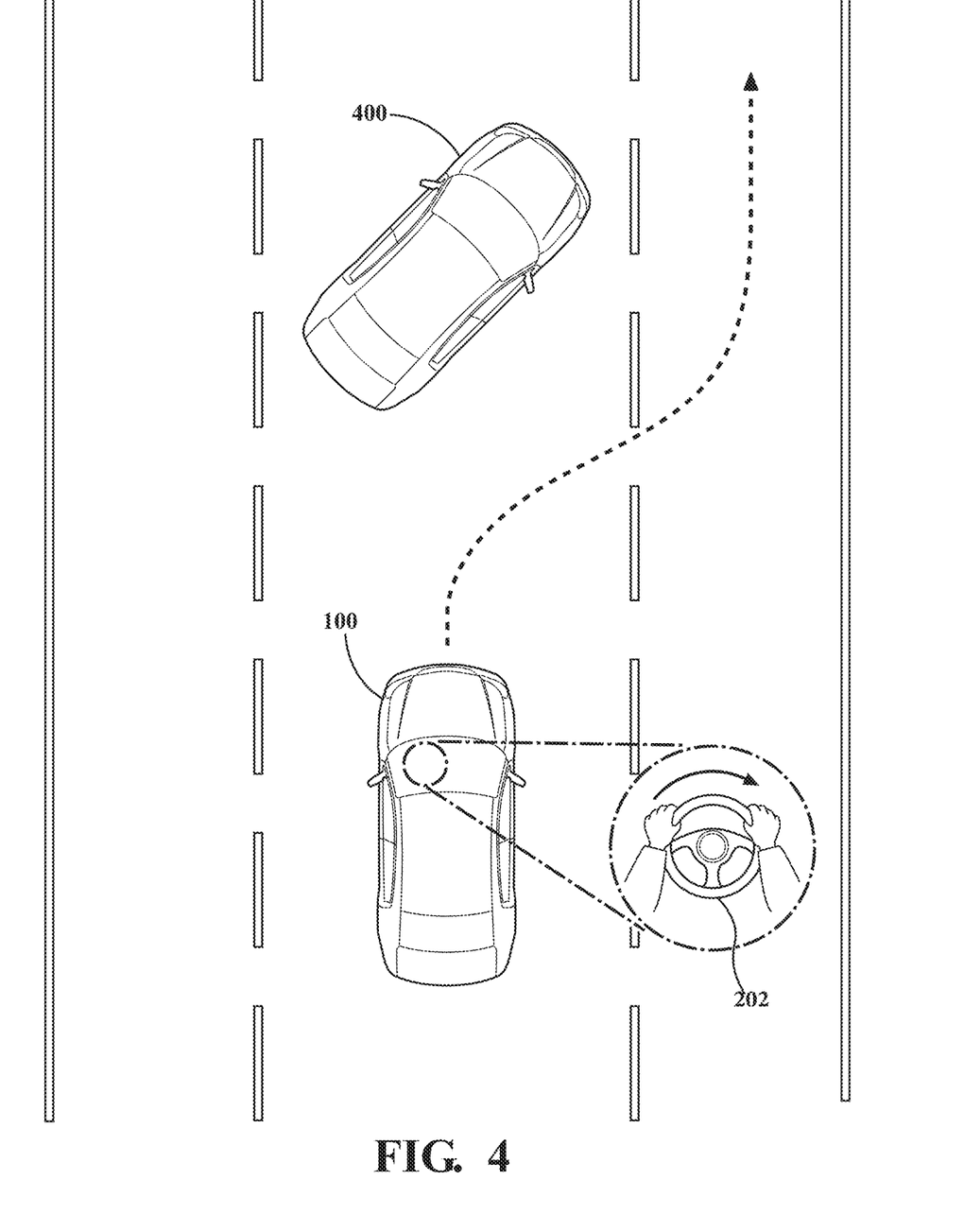
FIG. 4 illustrates one example of an autonomous steering maneuver to be performed by the vehicle of FIG. 1 influenced by an isometric torque input applied to a handwheel of the vehicle.
Figure 5:
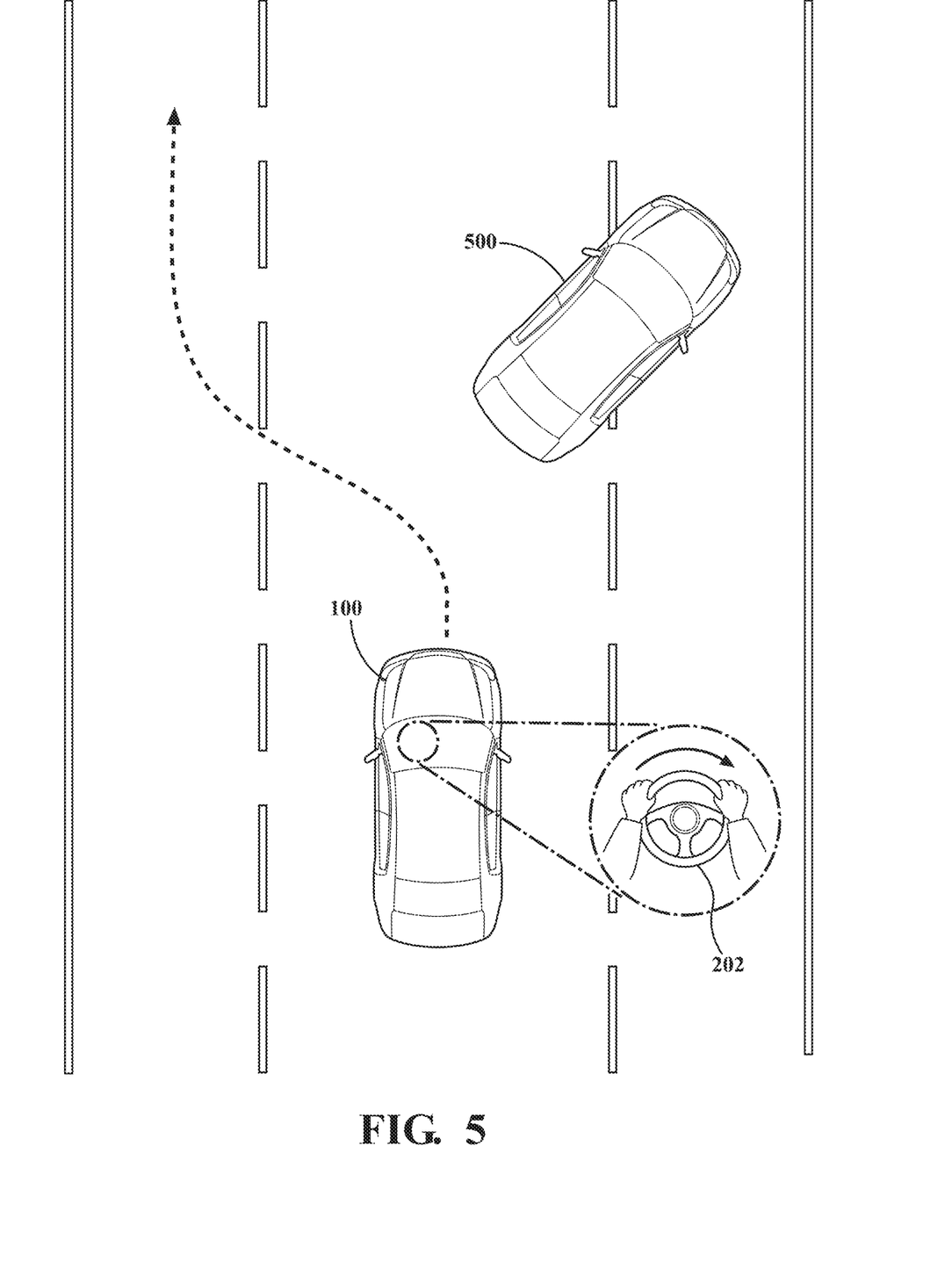
FIG. 5 illustrates another example of an autonomous steering maneuver to be performed by the vehicle of FIG. 1 influenced by an isometric torque input applied to a handwheel of the vehicle.

Referring now to FIGS. 4 and 5, illustrated examples of these scenarios are shown. As shown in FIG. 4, the processor 302 may predict a collision by the vehicle 100 with a disabled vehicle 400 in the same lane ahead. As shown, the vehicle 100 can travel safely to the left or to the right of the disabled vehicle 400, by traveling from the center lane to the left lane or by traveling from the center lane to the right lane. If the user of the vehicle 100 applies a clockwise isometric torque input to the handwheel 202, the processor 302 may determine that the autonomous steering maneuver should be a rightward maneuver, in which the vehicle 100 will travel to the right around the disabled vehicle 400 by traveling from the center lane to the right lane.

As shown in FIG. 5, the processor 302 may predict a collision by the vehicle 100 with a disabled vehicle 500 located partially in the same lane ahead and the lane to the right of the vehicle 100. Accordingly, the vehicle 100 cannot safely travel to the right around the disabled vehicle 500. The vehicle 100 can only safely travel to the left around the disabled vehicle 500 by traveling from the center lane to the left lane. Accordingly, the processor 302 may determine that the autonomous steering maneuver should be a leftward maneuver, in which the vehicle 100 will travel to the left around the disabled vehicle 500. As shown, the user is applying a clockwise isometric torque input to the handwheel 202, which the processor 302 may ignore in determining the autonomous steering maneuver.

As such, the HMI control system 170 allows the user of the vehicle 100 to potentially influence a decision made in situations where the autonomous driving system 160 takes over control of the vehicle 100. This allows the user to provide some input for selecting a maneuver performed by the vehicle 100 as determined by the autonomous driving system 160, giving the user some feeling of control over the situation when appropriate.

Figure 6:
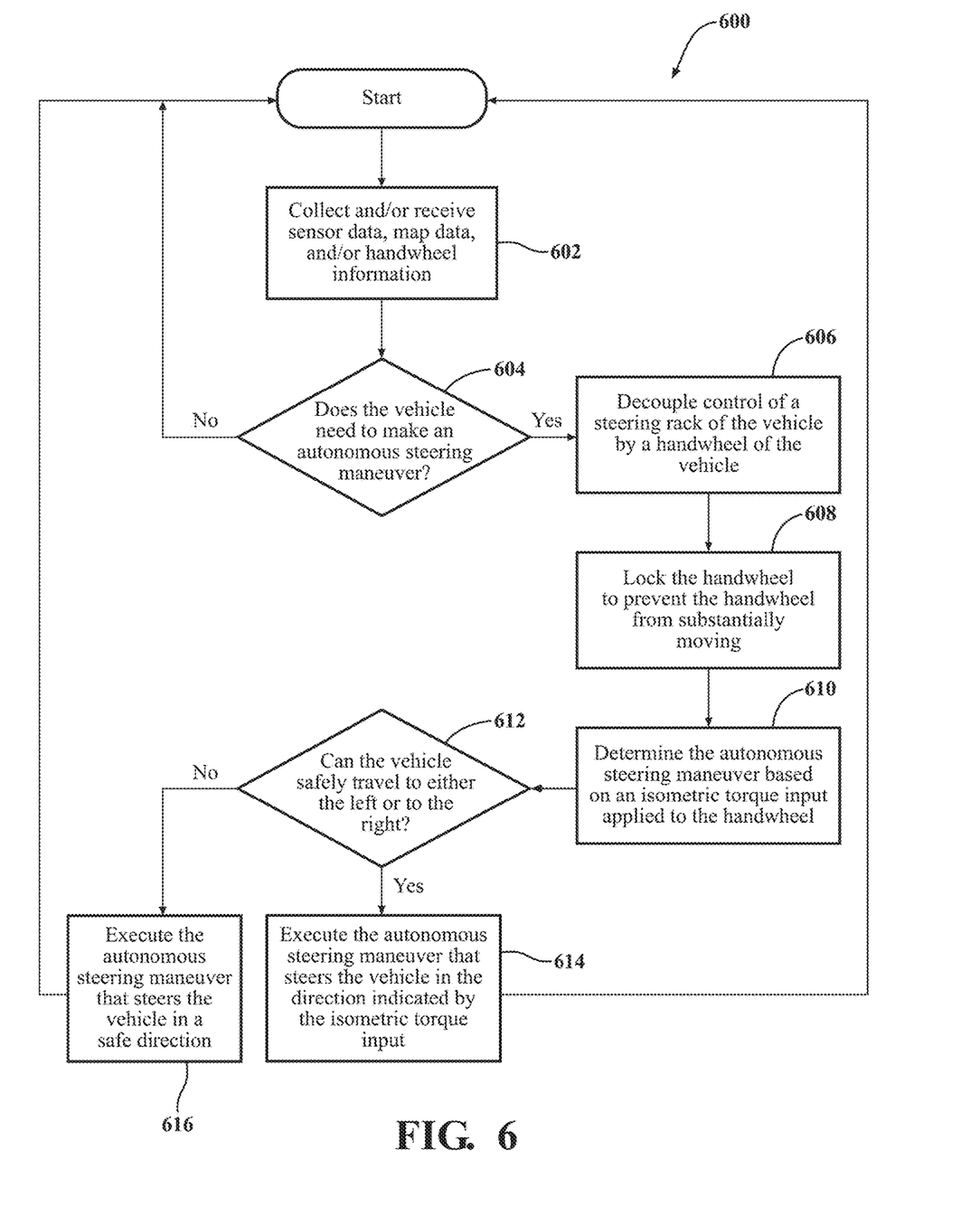
FIG. 6 illustrates a method associated with the HMI control system.

Referring now to FIG. 6, a method 600 for controlling a vehicle 100 having an autonomous mode and a semi-autonomous mode is shown. The method 600 will be described from the viewpoint of the vehicle 100 of FIG. 1 and the HMI control system 170 of FIG. 3. However, it should be understood that this is just one example of implementing the method 600. While the method 600 is discussed in combination with the HMI control system 170, it should be appreciated that the method 600 is not limited to being implemented within the HMI control system 170 but is instead one example of a system that may implement the method 600.

The method 600 begins at step 602. Here, the processor 302 executes instructions stored in the HMI control module 304 that cause the processor 302 to collect and/or receive sensor data 310, map data 312, and/or handwheel information 314. The sensor data 310 can include information about the sensors that the vehicle 100 is equipped with, including the capabilities and other information about such sensors. For example, the sensor data 310 can include information about the vehicle sensor(s) 106, the environment sensor(s) 112, and/or the handwheel sensor(s) 108. This information can include the speed and/or the acceleration of the vehicle 100, the GPS location of the vehicle 100, information about the dimensions of the vehicle 100, information about the external environment of the vehicle 100, for example, information about lane markers, information about nearby vehicles, objects, and/or people, including pedestrians and/or bicyclists, and/or information about weather conditions, and information about the handwheel 202 of the vehicle 100, for example, an isometric torque input applied to the handwheel 202 by the user of the vehicle 100. The sensor data 310 can include sensor data 148 from a sensor system 104 of the vehicle 100 of FIG. 1. The map data 312 can include data from a terrain map 144 and/or a static obstacle map 146 of the vehicle 100 of FIG. 1. The handwheel information 314 can include information collected by the handwheel sensor(s) 108 (including the handwheel torque sensor(s) 110) of the vehicle 100 of FIG. 1.

In step 604, the processor 302 executes instructions stored in the HMI control module 304 that cause the processor 302 to identify, based on the sensor data 310 and/or the map data 312, an event in which the vehicle 100 should perform an autonomous steering maneuver. The event can be identified when the vehicle 100 is being operated in a user input mode. The processor 302 can identify the event based on the sensor data 310 and/or based on the map data 312. In some examples, the event can be a predicted collision by the vehicle 100 with another object. The processor 302 may be configured to identify a predicted collision by the vehicle 100 with another object using the sensor data 310 and/or the map data 312. For example, the processor 302 can identify a predicted collision by the vehicle 100 with another nearby vehicle, an object in the road, and/or a person such as a pedestrian or a bicyclist. In other examples, the event can be a predicted or actual operation of the vehicle 100 outside a safety envelope.

If, in step 604, the processor 302 does not identify an event in which the vehicle 100 should perform an autonomous steering maneuver, the method 600 can start over. However, if the processor 302 identifies an event in which the vehicle 100 should perform an autonomous steering maneuver, the method 600 will continue to step 606. In step 606, the processor 302 executes instructions stored in the HMI control module 304 that cause the processor 302 to decouple control of a steering rack 210 by a handwheel 202, for example, by decoupling the electric communication between an electronic control unit of the handwheel 202 and an electronic control unit of the steering rack 210.

The method 600 continues to step 608, in which the processor 302 executes instructions stored in the HMI control module 304 that cause the processor 302 to lock the handwheel 202 to prevent the handwheel 202 from substantially moving. For example, the handwheel 202 can be locked by using the torque feedback unit 130 to apply a torque to the handwheel 202 so that it does not substantially move.

The method 600 continues to step 610, in which the processor 302 executes instructions stored in the HMI control module 304 that cause the processor 302 to determine the autonomous steering maneuver influenced by an isometric torque input applied to the handwheel 202. The isometric torque input may be detected when the handwheel 202 is locked through the use of the handwheel sensor(s) 108, including the handwheel torque sensor(s) 110 (FIG. 1) and/or the torque feedback unit 130. The isometric torque input can be a clockwise isometric torque input or a counterclockwise isometric torque input.

In step 612, the processor 302 executes instructions stored in the HMI control module 304 that cause the processor 302 to determine if the vehicle 100 can safely travel either to the left or to the right during the autonomous steering maneuver. If the vehicle 100 can safely travel either to the left or to the right during the autonomous steering maneuver, the method 600 will continue to step 614, in which the processor 302 executes instructions stored in the HMI control module 304 that cause the processor 302 to execute, by the vehicle 100, the autonomous steering maneuver that steers the vehicle 100 in the direction indicated by the isometric torque input. For example, if the isometric torque input is a clockwise isometric torque input, the processor 302 will execute, by the vehicle 100, a rightward autonomous steering maneuver that steers the vehicle 100 to the right. If the isometric torque input is a counterclockwise isometric torque input, the processor 302 will execute, by the vehicle 100, a leftward autonomous steering maneuver that steers the vehicle 100 to the left.

If the vehicle 100 cannot safely travel either to the left or to the right during the autonomous steering maneuver, the method 600 will continue to step 616, in which the processor 302 executes instructions stored in the HMI control module 304 that cause the processor 302 to execute, by the vehicle 100, the autonomous steering maneuver that steers the vehicle 100 in a safe direction. In some cases, this may involve ignoring the isometric torque input from the user. For example, if the vehicle 100 can only travel safely to the right, and the user is applying a counterclockwise isometric torque input to the handwheel 202, the processor 302 will ignore the isometric torque input and execute, by the vehicle 100, a rightward steering maneuver that steers the vehicle 100 to the right. If the vehicle 100 can only travel safely to the left, and the user is applying a clockwise isometric torque input to the handwheel 202, the processor 302 will ignore the isometric torque input and execute, by the vehicle 100, a leftward steering maneuver that steers the vehicle 100 to the left.

FIG. 1 will now be discussed in full detail as an example environment within which the system and methods disclosed herein may operate. In one or more embodiments, the vehicle 100 is an autonomous vehicle 100. As used herein, "autonomous vehicle" refers to a vehicle 100 that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle 100 user (i.e., driver) provides inputs to the vehicle 100 to perform a portion of the navigation and/or maneuvering of the vehicle 100 along a travel route. Such semi-autonomous operation can include supervisory control as implemented by the HMI control system 170 to ensure the vehicle 100 remains within defined state constraints.

The vehicle 100 can include one or more processor(s) 102. In one or more arrangements, the processor(s) 102 can be a main processor of the vehicle 100. For instance, the processor(s) 102 can be an electronic control unit (ECU). The vehicle 100 can include one or more data store(s) 140 for storing one or more types of data. The data store(s) 140 can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 140 can be a component of the processor(s) 102, or the data store(s) 140 can be operatively connected to the processor(s) 102 for use thereby. The term "operatively connected," as used throughout this description, can include direct or indirect connections, including connections without direct physical contact.

In one or more arrangements, the data store(s) 140 can include map data 142. The map data 142 can include maps of one or more geographic areas. In some instances, the map data 142 can include information or data on roads, traffic control devices, road markings, structures, features, and/or landmarks in the one or more geographic areas. The map data 142 can be in any suitable form. In some instances, the map data 142 can include aerial views of an area. In some instances, the map data 142 can include ground views of an area, including 360-degree ground views. The map data 142 can include measurements, dimensions, distances, and/or information for one or more items included in the map data 142 and/or relative to other items included in the map data 142. The map data 142 can include a digital map with information about road geometry. The map data 142 can be high quality and/or highly detailed.

In one or more arrangements, the map data 142 can include a terrain map 144. The terrain map 144 can include information about the ground, terrain, roads, surfaces, and/or other features of one or more geographic areas. The terrain map 144 can include elevation data in the one or more geographic areas. The map data 142 can be high quality and/or highly detailed. The terrain map 144 can define one or more ground surfaces, which can include paved roads, unpaved roads, land, and other things that define a ground surface.

In one or more arrangements, the map data 142 can include a static obstacle map 146. The static obstacle map 146 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map 146 can have location data, size data, dimension data, material data, and/or other data associated with it. The static obstacle map 146 can include measurements, dimensions, distances, and/or information for one or more static obstacles. The static obstacle map 146 can be high quality and/or highly detailed. The static obstacle map 146 can be updated to reflect changes within a mapped area.

The data store(s) 140 can also include sensor data 148. In this context, "sensor data" means any information about the sensors that the vehicle 100 is equipped with, including the capabilities and other information about such sensors. As will be explained below, the vehicle 100 can include the sensor system 104. The sensor data 148 can relate to one or more sensors of the sensor system 104. As an example, in one or more arrangements, the sensor data 148 can include information from the handwheel sensor(s) 108, including the handwheel torque sensor(s) 110, which will be described in further detail below.

In some instances, at least a portion of the map data 142 and/or the sensor data 148 can be located in one or more data stores located onboard the vehicle 100. Alternatively, or in addition, at least a portion of the map data 142 and/or the sensor data 148 can be located in one or more data stores that are located remotely from the vehicle 100.

As noted above, the vehicle 100 can include the sensor system 104. The sensor system 104 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 104 includes a plurality of sensors, the sensors can work independently from each other. Alternatively, two or more of the sensors can work in combination with each other. In such a case, the two or more sensors can form a sensor network. The sensor system 104 and/or the one or more sensors can be operatively connected to the processor(s) 102, the data store(s) 140, and/or another element of the vehicle 100 (including any of the elements shown in FIG. 1). The sensor system 104 can acquire data of at least a portion of the external environment of the vehicle 100 (e.g., nearby vehicles).

The sensor system 104 can include any suitable type of sensor. Various examples of different types of sensors will be described herein. However, it will be understood that the embodiments are not limited to the particular sensors described. The sensor system 104 can include one or more vehicle sensor(s) 106. The vehicle sensor(s) 106 can detect, determine, and/or sense information about the vehicle 100 itself. In one or more arrangements, the vehicle sensor(s) 106 can be configured to detect, and/or sense position and orientation changes of the vehicle 100, such as, for example, based on inertial acceleration. In one or more arrangements, the vehicle sensor(s) 106 can include one or more accelerometers, one or more gyroscopes, an inertial measurement unit (IMU), a dead-reckoning system, a global navigation satellite system (GNSS), a global positioning system (GPS), a navigation system 138, and/or other suitable sensors. The vehicle sensor(s) 106 can be configured to detect, and/or sense one or more characteristics of the vehicle 100. In one or more arrangements, the vehicle sensor(s) 106 can include a speedometer to determine a current speed of the vehicle 100.

The vehicle sensor(s) 106 can also include one or more handwheel sensor(s) 108. The handwheel sensor(s) 108 can include, as mentioned above, one or more handwheel torque sensor(s) 110. The handwheel torque sensor(s) 110 can be configured to sense a torque input to the handwheel 202. For example, the handwheel torque sensor(s) 110 can sense a magnitude and/or a direction (clockwise or counterclockwise) of a torque applied to the handwheel 202. In some instances, the handwheel torque sensor(s) 110 can be the torque feedback unit 130 of the steer-by-wire system 200.

Additionally or alternatively, the sensor system 104 can include one or more environment sensor(s) 112 configured to acquire, and/or sense driving environment data. "Driving environment data" includes data or information about the external environment in which an autonomous vehicle is located or one or more portions thereof. For example, the environment sensor(s) 112 can be configured to detect, quantify and/or sense obstacles in at least a portion of the external environment of the vehicle 100 and/or information/data about such obstacles. Such obstacles may be stationary objects and/or dynamic objects. The environment sensor(s) 112 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 104 will be described herein. The example sensors may be part of the vehicle sensor(s) 106 and/or the environment sensor(s) 112. However, it will be understood that the embodiments are not limited to the particular sensors described.

As an example, in one or more arrangements, the sensor system 104 can include one or more RADAR sensors 114, one or more LIDAR sensor 116, one or more sonar sensor 118, and/or one or more camera(s) 120. In one or more arrangements, the camera(s) 120 can be high dynamic range (HDR) camera(s) or infrared (IR) camera(s).

The vehicle 100 can also include an input system 152. An "input system" includes any device, component, system, element or arrangement or groups thereof that enable information/data to be entered into a machine. The input system 152 can receive an input from a vehicle 100 occupant (e.g., a driver or a passenger). The vehicle 100 can also include an output system 154. An "output system" includes any device, component, arrangement, or groups thereof that enable information/data to be presented to a vehicle passenger (e.g., a person, a vehicle passenger, etc.).

The vehicle 100 can include vehicle systems 122. Various examples of the vehicle system 122 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 124, a braking system 126, a steer-by-wire system 128, a throttle system 132, a transmission system 134, a signaling system 136, and/or a navigation system 138. Each of these systems can include one or more devices, components, and/or a combination thereof, now known or later developed.

The navigation system 138 can include one or more devices, applications, and/or combinations thereof, now known or later developed, configured to determine the geographic location of the vehicle 100 and/or to determine a travel route for the vehicle 100. The navigation system 138 can include one or more mapping applications to determine a travel route for the vehicle 100. The navigation system 138 can include a global positioning system, a local positioning system, or a geolocation system.

The processor(s) 102, the HMI control system 170, and/or the autonomous driving system 160 can be operatively connected to communicate with the vehicle systems 122 and/or individual components thereof. For example, returning to FIG. 1, the processor(s) 102 and/or the autonomous driving system 160 can be in communication to send and/or receive information from the vehicle systems 122 to control the movement, speed, maneuvering, heading, direction, etc. of the vehicle 100. The processor(s) 102, the HMI control system 170, and/or the autonomous driving system 160 may control some or all of these vehicle systems 122 and, thus, may be partially or fully autonomous.

The processor(s) 102, the HMI control system 170, and/or the autonomous driving system 160 can be operatively connected to communicate with the vehicle systems 122 and/or individual components thereof. For example, returning to FIG. 1, the processor(s) 102, the HMI control system 170, and/or the autonomous driving system 160 can be in communication to send and/or receive information from the vehicle systems 122 to control the movement, speed, maneuvering, heading, direction, etc. of the vehicle 100. The processor(s) 102, the HMI control system 170, and/or the autonomous driving system 160 may control some or all of these vehicle systems 122.

The processor(s) 102, the HMI control system 170, and/or the autonomous driving system 160 may be operable to control the navigation and/or maneuvering of the vehicle 100 by controlling one or more of the vehicle systems 122 and/or components thereof. For instance, when operating in an autonomous mode, the processor(s) 102, the HMI control system 170, and/or the autonomous driving system 160 can control the direction and/or speed of the vehicle 100. The processor(s) 102, the HMI control system 170, and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuator(s) 158. The actuator(s) 158 can be any element or combination of elements operable to modify, adjust and/or alter one or more of the vehicle systems 122 or components thereof responsive to receiving signals or other inputs from the processor(s) 102 and/or the autonomous driving system 160. Any suitable actuator can be used. For instance, the actuator(s) 158 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor, implement one or more of the various processes described herein. One or more of the modules can be a component of the processor(s) 102, or one or more of the modules can be executed on and/or distributed among other processing systems to which the processor(s) 102 is operatively connected. The modules can include instructions (e.g., program logic) executable by one or more processor(s) 102. Alternatively, or in addition, one or more data store(s) 140 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

As previously mentioned, the vehicle 100 can include an autonomous driving system 160. The autonomous driving system 160 can be configured to receive data from the sensor system 104 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 102, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data 142.

The autonomous driving system 160, either independently or in combination with the HMI control system 170, can be configured to determine travel path(s), current autonomous driving maneuvers for the vehicle 100, future autonomous driving maneuvers and/or modifications to current autonomous driving maneuvers based on data acquired by the sensor system 104, driving scene models, and/or data from any other suitable source such as determinations from the sensor data 148 as implemented by the module. "Driving maneuver" means one or more actions that affect the movement of a vehicle 100. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 122).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor; and
   a memory in communication with the processor, the memory having a human-machine interface module having instructions that, when executed by the processor, cause the processor to:
   identify, based on sensor data regarding a vehicle and an environment in which the vehicle operates, an event in which the vehicle should perform an autonomous steering maneuver determined by an autonomous driving system;
   in response to identifying the event, decouple control of a steering rack of the vehicle by a handwheel of the vehicle and lock the handwheel to prevent the handwheel from substantially moving;
   identify a direction of an isometric torque input applied to the handwheel and detected by the processor via one or more sensors of the vehicle when the handwheel is locked, the direction being one of clockwise and counterclockwise;
   determine, by the autonomous driving system, the autonomous steering maneuver to be performed by the vehicle based on the direction of the isometric torque input; and
   execute, by the vehicle, the autonomous steering maneuver.

2. The system of claim 1, wherein the instructions further cause the processor to identify the event when the vehicle is being operated in a user input mode, the user input mode being a mode that allows a driver of the vehicle to control the lateral movement of the vehicle via the handwheel.

3. The system of claim 1, wherein the steering rack and the handwheel are components of a steer-by-wire system of the vehicle, and wherein decoupling control of the steering rack includes decoupling an electric communication between an electronic control unit of the handwheel and an electronic control unit of the steering rack.

4. The system of claim 1, wherein:
   the autonomous steering maneuver includes a leftward maneuver that steers the vehicle to the left when the direction of the isometric torque input is counterclockwise; and
   the autonomous steering maneuver includes a rightward maneuver that steers the vehicle to the right when the direction of the isometric torque input is clockwise.

5. The system of claim 1, wherein the event includes at least one of:
   a predicted collision by the vehicle with another object; and
   a predicted or actual operation of the vehicle outside a safety envelope.

6. A method comprising the steps of:
   identifying, by a processor based on sensor data regarding a vehicle and an environment in which the vehicle operates, an event in which the vehicle should perform an autonomous steering maneuver determined by an autonomous driving system;
   in response to identifying the event, decoupling control of a steering rack of the vehicle by a handwheel of the vehicle and locking the handwheel to prevent the handwheel from substantially moving;
   identifying a direction of an isometric torque input applied to the handwheel and detected by the processor via one or more sensors of the vehicle when the handwheel is locked, the direction being one of clockwise and counterclockwise;
   determining, by the autonomous driving system, the autonomous steering maneuver to be performed by the vehicle based on the direction of isometric torque input; and
   executing, by the vehicle, the autonomous steering maneuver.

7. The method of claim 6, further comprising the step of identifying the event when the vehicle is being operated in a user input mode, the user input mode being a mode that allows a driver of the vehicle to control the lateral movement of the vehicle via the handwheel.

8. The method of claim 6, wherein decoupling control of the steering rack from the handwheel includes decoupling an electric communication between an electronic control unit of the handwheel and an electronic control unit of the steering rack.

9. The method of claim 6, wherein:
the autonomous steering maneuver includes a leftward maneuver that steers the vehicle to the left when the direction of the isometric torque input is counterclockwise; and
the autonomous steering maneuver includes a rightward maneuver that steers the vehicle to the right when the direction of the isometric torque input is clockwise.

10. The method of claim 6, wherein the event includes at least one of:
a predicted collision by the vehicle with another object; and
a predicted or actual operation of the vehicle outside a safety envelope.

11. A non-transitory computer-readable medium including instructions that, when executed by a processor, cause the processor to:
identify, based on sensor data regarding a vehicle and an environment in which the vehicle operates, an event in which the vehicle should perform an autonomous steering maneuver determined by an autonomous driving system;
in response to identifying the event, decouple control of a steering rack of the vehicle by a handwheel of the vehicle and lock the handwheel to prevent the handwheel from substantially moving;
identify a direction of an isometric torque input applied to the handwheel and detected by the processor via one or more sensors of the vehicle when the handwheel is locked, the direction being one of clockwise and counterclockwise;
determine, by the autonomous driving system, the autonomous steering maneuver to be performed by the vehicle based on the direction of the isometric torque input;
execute, by the vehicle, the autonomous steering maneuver.

12. The non-transitory computer-readable medium of claim 11, wherein the instructions further cause the processor to identify the event when the vehicle is being operated in a user input mode, the user input mode being a mode that allows a driver of the vehicle to control the lateral movement of the vehicle via the handwheel.

13. The non-transitory computer-readable medium of claim 11, wherein:
the autonomous steering maneuver includes a leftward maneuver that steers the vehicle to the left when the direction of the isometric torque input is counterclockwise; and
the autonomous steering maneuver includes a rightward maneuver that steers the vehicle to the right when the direction of the isometric torque input is clockwise.

14. The non-transitory computer-readable medium of claim 11, wherein the event includes at least one of:
a predicted collision by the vehicle with another object; and
a predicted or actual operation of the vehicle outside a safety envelope.

* * * * *